United States Patent

Hingiss

[11] Patent Number: 5,823,145
[45] Date of Patent: Oct. 20, 1998

[54] PET FLEA BRUSH

[76] Inventor: Mark J. Hingiss, 3602 Forrest Hill Blvd. #115, West Palm Beach, Fla. 33406

[21] Appl. No.: 663,652
[22] Filed: Jun. 14, 1996

Related U.S. Application Data

[63] Continuation-in-part of Ser. No. 621,794, Mar. 22, 1996.
[51] Int. Cl.[6] ................................... A01K 13/00
[52] U.S. Cl. ..................... 119/603; 119/612; 119/628; 119/652
[58] Field of Search ..................... 119/604, 602, 119/603, 612, 652, 664, 628; 132/114, 120, 121, 125, 313; 401/146, 149, 150; 15/320, 321, 322, 106, 107, 110

[56] References Cited

U.S. PATENT DOCUMENTS

| | | |
|---|---|---|
| 1,061,276 | 5/1913 | Ellis ............................ 15/107 |
| 1,408,951 | 3/1922 | Kern ........................ 119/612 X |
| 3,053,264 | 9/1962 | Breton ......................... 132/125 |
| 3,209,386 | 10/1965 | Weber ......................... 132/120 |
| 4,617,875 | 10/1986 | Holland ....................... 119/603 |
| 4,799,456 | 1/1989 | Young ......................... 119/603 |
| 4,902,154 | 2/1990 | Valenza .................... 119/664 X |
| 4,995,344 | 2/1991 | Olson ......................... 119/603 |
| 5,600,865 | 2/1997 | Morrison ..................... 132/119 |

Primary Examiner—Cary E. O'Connor
Assistant Examiner—Yvonne R. Abbott
Attorney, Agent, or Firm—Malin, Haley, DiMaggio & Crosby, P.A.

[57] ABSTRACT

A pet flea brush for simultaneously grooming and spraying a pet for fleas. The brush generally comprises a head portion, a handle portion, a plurality of bristles projecting from the head, a plurality of nozzles between the bristles, a fluid chamber, a pump dispenser in the brush, and a trigger which engages the pump and is accessible to the user for activating the pump.

13 Claims, 6 Drawing Sheets

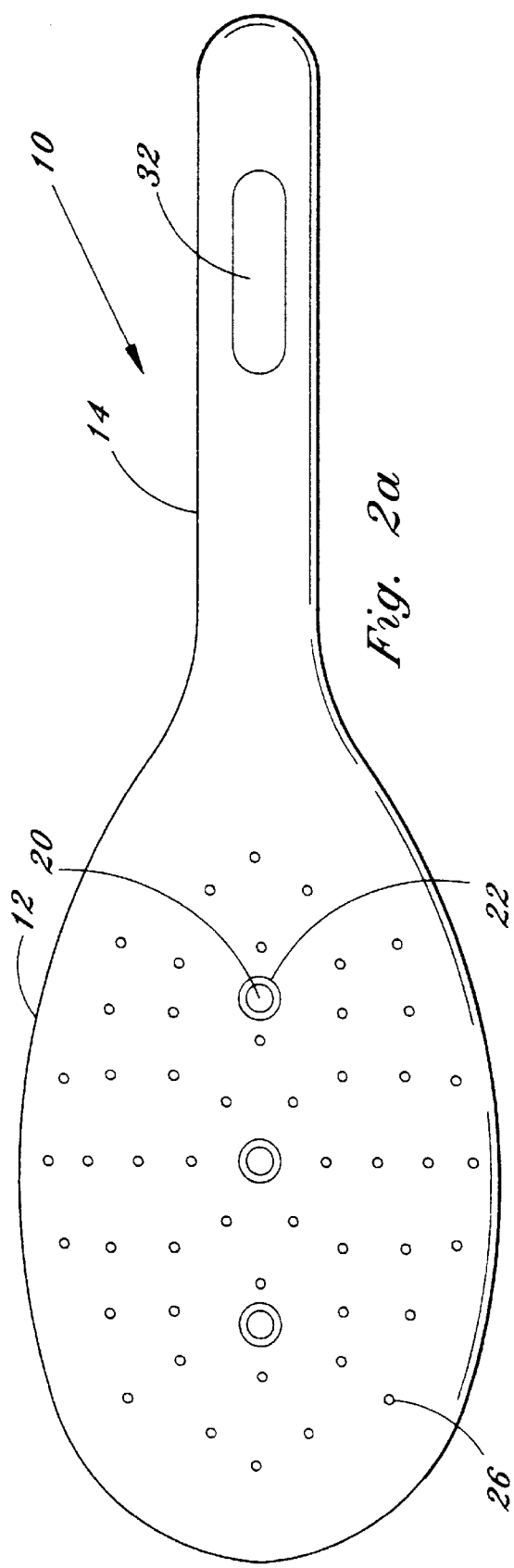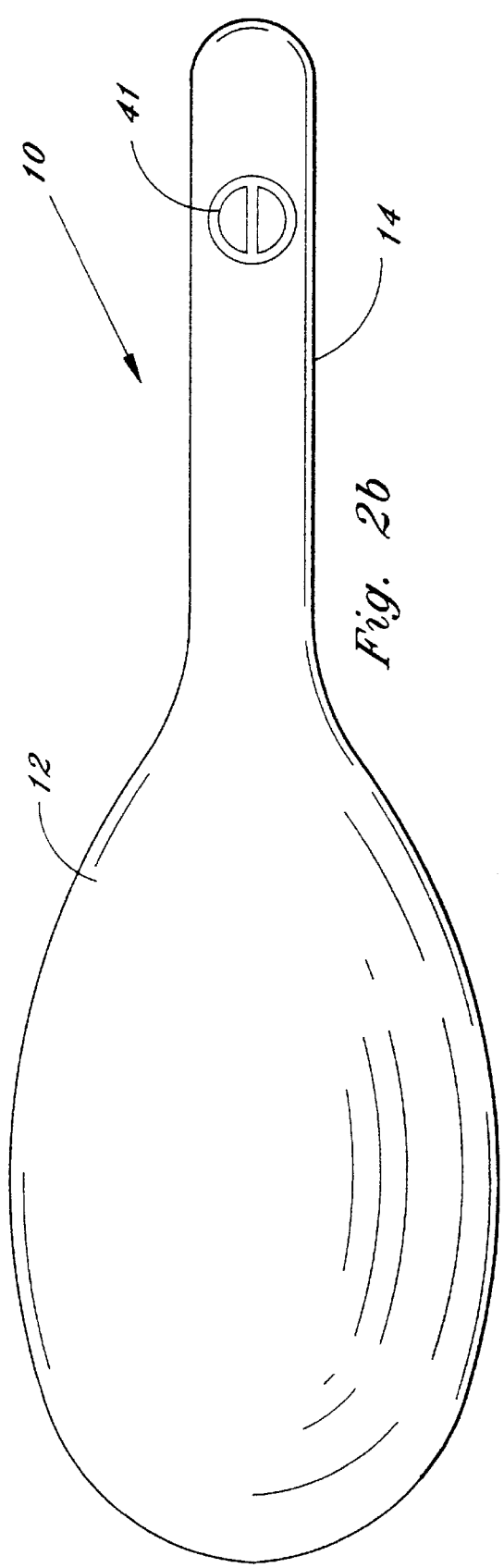
Fig. 2a
Fig. 2b

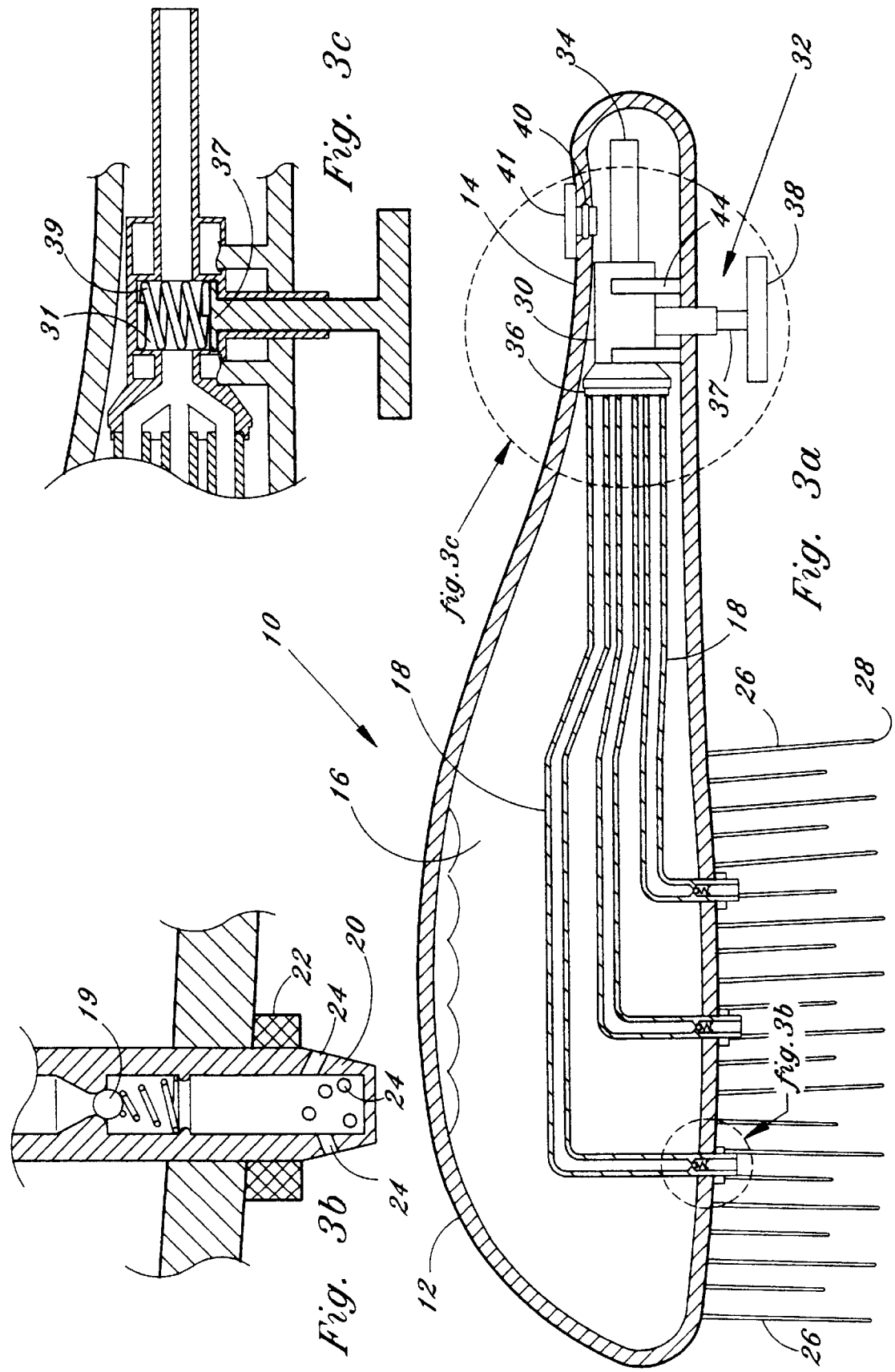

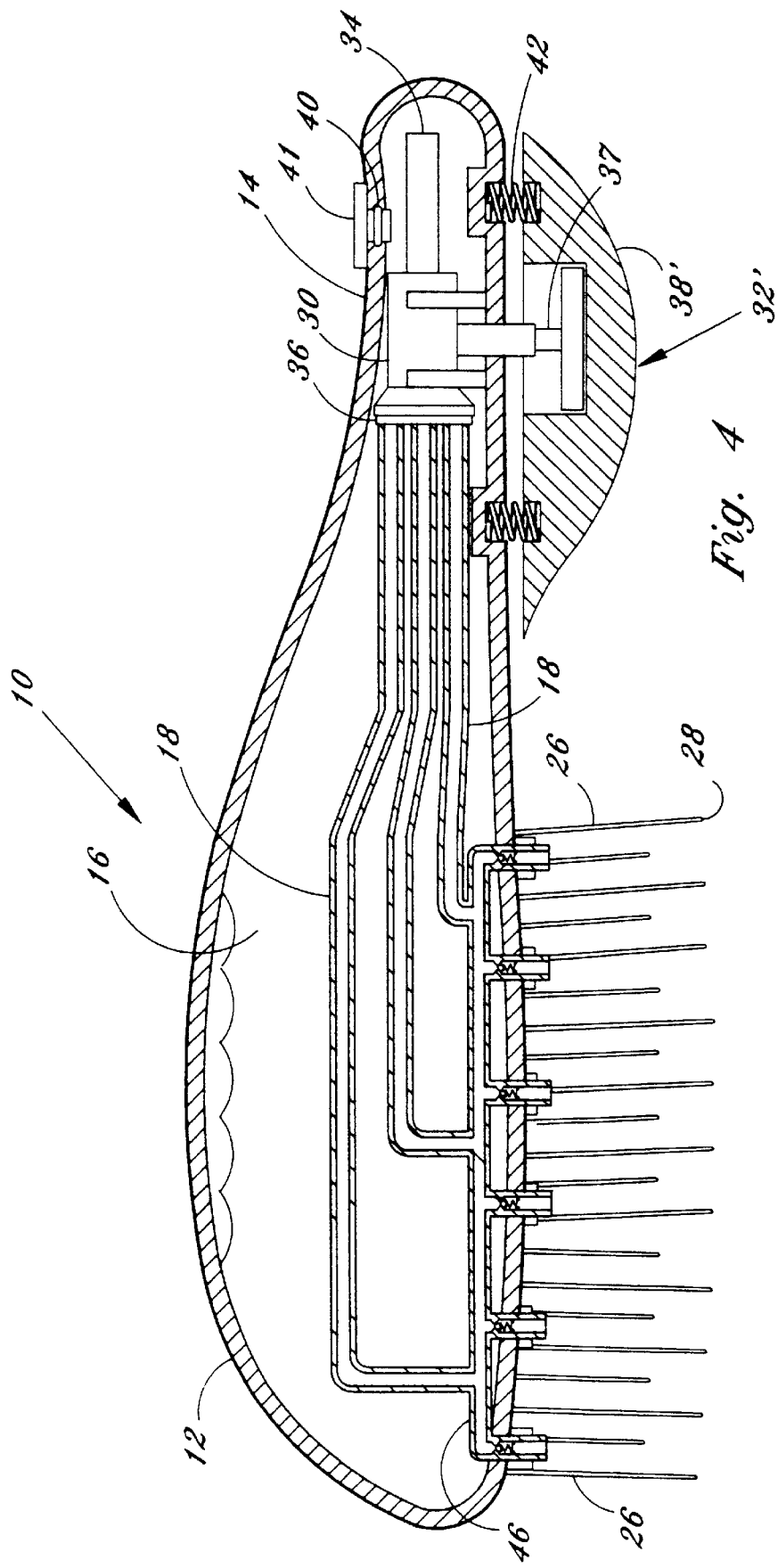

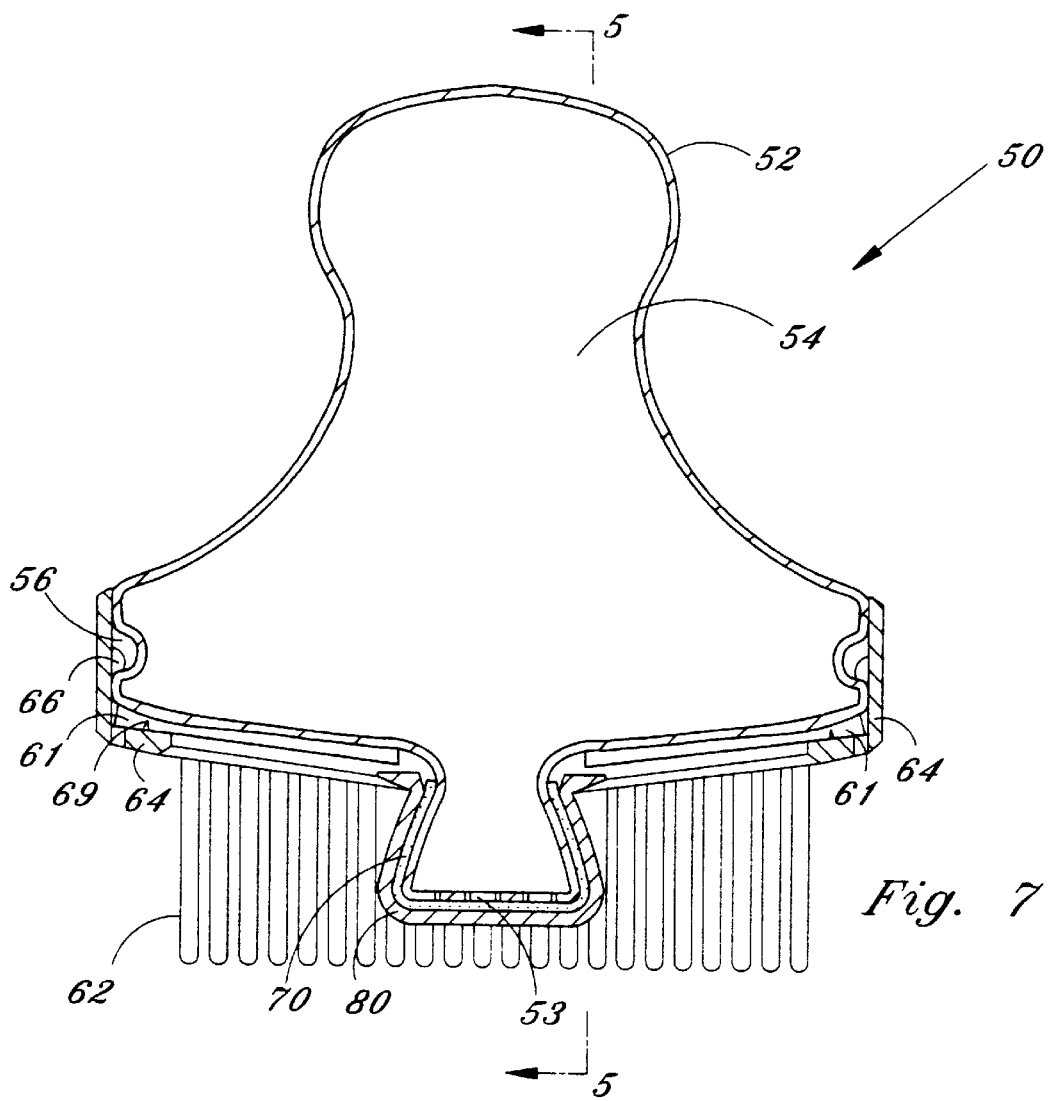
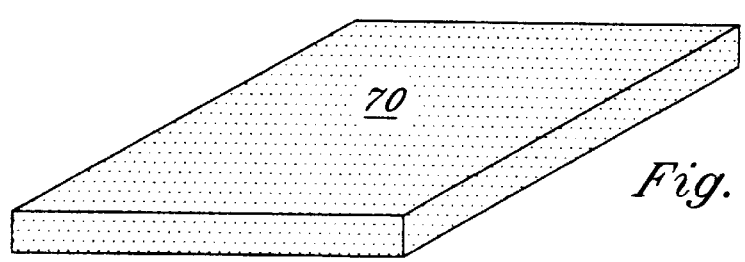
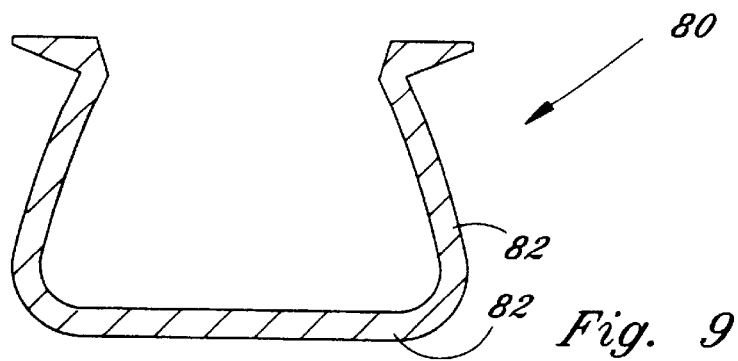

PET FLEA BRUSH

This application is a continuation-in-part of U.S. application Ser. No. 08/621,794 filed Mar. 22, 1996, pending.

BACKGROUND OF THE INVENTION

1. Field of the Invention

This invention generally relates to pet animal brushes, and more particularly to a pet flea brush capable of simultaneously grooming a pet, or while treating or spraying it with a flea killing solution.

2. Description of the Prior Art

Fleas are annoying to pets, such as dogs and cats, and their owners, so a pet should be periodically treated for fleas. However, treating for fleas is uncomfortable for the pet and not easily accomplished. Flea treatment chemicals are commonly applied by spraying or dipping. Spraying flea solution directly on the pet typically frightens and irritates the pet, while dipping an animal induces an animal's natural resistance to drowning. Hence, an animal instinctively resists being dipped or sprayed with flea chemicals by struggling to get free. Nonetheless, in the interest of the pet's health, well being, and comfort, the animal must be properly treated.

By contrast, pet animals, especially dogs, are very receptive to being brushed and pampered. It is quite easy to find a pet dog or cat that will quietly cooperate while being brushed and groomed. This is because brushing is relaxing and pleasing to the animal. Thus, if one's pet could be simultaneously brushed and sprayed for fleas, it could be either subdued or tricked into submission while being treated. Accordingly, a flea brush capable of applying a flea killing solution unbeknownst to the pet would be well received.

Notwithstanding the foregoing needs, there is nothing currently known in the background art which solves the problem of comfortably treating a pet animal for fleas as envisioned by the instant invention. The instant invention addresses these needs by providing a brush and flea solution sprayer combination that simultaneously brushes and sprays a pet.

SUMMARY OF THE INVENTION

It is an object of the instant invention to provide a pet brush which simultaneously grooms and treats a pet for fleas.

It is another object of the instant invention to provide a flea brush which relaxes a pet while treating it for fleas.

It is a further object of the instant invention to provide a flea brush having a structure which retains and dispenses flea treatment solution while brushing the pet.

It is an additional object of this invention to provide a flea brush which is comfortable to the pet.

It is still a further object to provide a flea brush that does not leak.

It is still another object of the instant invention to provide a flea brush that is easily used by the pet owner.

In light of these and other objects, the instant invention provides a pet flea brush comprising a base structure defining a handle portion integrally formed with a head portion, a pumping mechanism interactively attached to the handle, a flea killing solution retention chamber defined by the interior volume of the brush, a plurality of bristles projecting from the head of the brush, a plurality of nozzles defined by the head of the brush, and a plurality of intake hoses inside the brush, fluidly communicating the solution chamber and output nozzles. The theory of the pet flea brush is premised on relaxing the pet while it is being sprayed for fleas. It has been determined that simply spraying a pet irritates, scares, and annoys the pet, causing it to struggle. However, brushing the animal while spraying it for fleas has an overall calming effect. An added benefit is that the pet is being groomed while being sprayed for fleas.

In accordance with these and other objects which will become apparent hereinafter, the instant invention will now be described with particular reference to the accompanying drawings.

BRIEF DESCRIPTION OF THE DRAWINGS

FIG. 2a is a bottom planar view of the preferred embodiment of the instant invention.

FIG. 2b is a top planar view of the preferred embodiment of the instant invention.

FIG. 3a is a cross sectional view of the preferred embodiment of the instant invention taken along line 3—3 of FIG. 1.

FIG. 3b is an enlarged detail view of the nozzle section of the instant invention.

FIG. 3c is an enlarged detail view of the trigger section of the instant invention.

FIG. 4 is a cross sectional view of an alternative embodiment of the instant invention.

FIG. 7 is a cross sectional end view taken along line 7—7 of FIG. 5.

DESCRIPTION OF THE PREFERRED EMBODIMENTS

Figure 1:
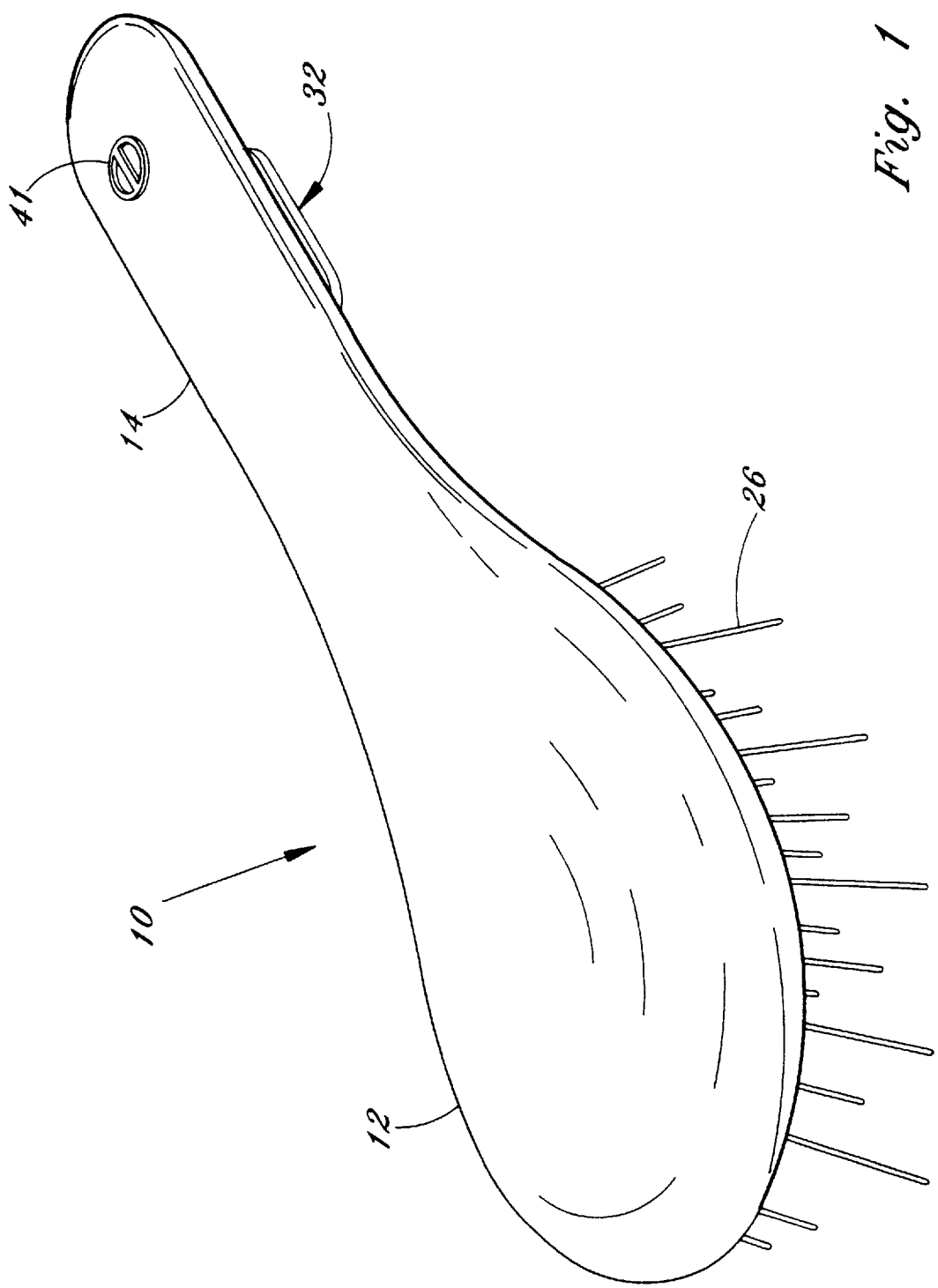
FIG. 1 is a perspective view of the preferred embodiment of the flea brush of the instant invention.

With reference to the drawings, FIGS. 1–7 depict the instant invention which comprises a pet flea brush 10 for simultaneously grooming pet animals, while treating them for fleas. The flea brush 10 may be most useful for domestic pets, such as dogs and cats, but is adapted for use with all animals. The preferred embodiment of the instant invention is illustrated in FIGS. 1–4. Referring to FIGS. 1–2b, the flea brush 10 generally comprises a base structure 12, 14, a plurality of bristles 26, a plurality of output nozzles 20, and a spring-loaded trigger 32 for actuating a pump 30 inside the brush. The base comprises a head portion 12 and a handle portion 14, preferably embodied in a single, uniform, injection-molded base structure that facilitates the internal placement of sprayer components. The head 12 and handle 14 may also comprise separate sections sealingly joined together by adhesives, hardware, heat-welding, interlocking/mating ridges or other means known. Having individual sections facilitates another convenient design for the placement of the interior volume components, discussed infra. The bristles 26 may have rounded tips 28 for the pet's comfort. The plurality of output nozzles 20 are best shown in FIG. 2a. The output nozzles 20 have at least one output port 24 and may be sealingly engaged with the brush head 12 using washers 22. A screen or perforated sheet may be inserted in the nozzle 20 to produce a spray-like flow from the output port when the trigger is pressed. The trigger 32 preferably comprises a conventional spring-loaded pump trigger, as shown in FIGS. 3a and 3c. The trigger may include a single, finger-like handle 38 or an elongated, hand-like handle 38' for more convenient pumping.

Referring to FIG. 3a, the flea brush 10 defines an interior volume or fluid chamber 16. The chamber 16 may be lined, such as with a plastic sheet or enamel coating, to further prevent leaking. The fluid chamber 16 houses the flea-fighting solution, as well as the pump 30 and intake lines 18. The intake lines 18 are connected at one end to the pump output port 36 and at the opposite end to the output nozzles 20 by fittings/couplings 23 for sealed connections. With reference to FIG. 3b, each intake line may include a pressure actuated check valve 19 to prevent leaking from the output nozzles 20. The check valves 19 only require low pressure ratings since they are intended to prevent dripping. The check valves 19 may comprise spring-loaded ball joints for releasing and retaining fluid. The intake lines 18 fluidly communicate the pump 30 with the output nozzles 20. The pump 30 feeds the intake lines 18 with fluid via its output port 36 and forces the fluid through the lines 18 toward the output nozzles 20. The output nozzles 20 extend outside the head portion 12 of the brush 10 and comprise at least one exit port 24 through which the flea-fighting fluid passes to ambient. A plurality of exit ports 24 may be employed in each nozzle 20 for a finer spray or mist, as seen in FIG. 3b. On the other hand, a screen filter may be used with a single port to create a spray, as discussed above. In fact, the brush preferably incorporates one to three nozzles 20, each with either a plurality of exit ports or a screen for a broader distribution of the flea fluid spray.

The brush 10 may employ a plurality of output nozzles 20 or just a single output nozzle 20. In the preferred embodiment, one intake line 18 is employed for each nozzle 20. In an alternative embodiment, at least one intake line 18 may feed a plurality of output nozzles 20. This may be accomplished by directly coupling the feed lines 18 and nozzles 20 through a known splicing technique. In the alternative, a manifold 46 may be employed for connecting the intake lines to the output nozzles.

The brush 10 defines a fluid chamber 16, for holding flea solution and the pump 30. The fluid chamber 16 is filled with solution through a fill port 40, defined by the brush. The fill port 40 is preferably located on the top side of the handle 14 and is sealed with a plug 41. The plug 41 may include a tether that hangs in the chamber 16 to prevent losing the plug 41. The pump 30 draws the fluid from the chamber 16 for spraying. The pump 30 is preferably located in the handle 14 for convenient engagement with the trigger 32 and for efficiently drawing fluid from the lower portions of the fluid chamber 16. The pump 30 may comprise a conventional pump having an intake port 34 at one end and an output port 36 at an opposite end to draw solution therethrough when the trigger 32 is actuated. The intake port 34 should include a check valve similar to that in FIG. 3b. The pump 30 also defines a trigger chamber 31 for partially receiving the trigger 32. The spring-loaded trigger 32 comprises a plunger 37, spring 39, and trigger handle 38. The plunger 37 is at least partially disposed in the trigger chamber 31, which is defined between the intake and output ports 34, 36. The trigger handle 38 projects outside the brush for user engagement. The spring 39 engages the end of the plunger 37 inside the pump chamber 31 to force the trigger 32 to return to its relaxed state when released. The trigger handle 38 may comprise a finger-like trigger 38 as shown in FIGS. 1–3, or it may comprise an elongated trigger handle 38' for full hand engagement as shown in FIG. 4. The elongated trigger handle 38' preferably extends along the bottom side of the handle 14. The ends of the elongated trigger 38' may be suspended and connected to the handle 14 by small springs 42 to prevent any drag in the trigger 32'.

The brush 10 of the instant invention may be manufactured by an injection molding process to facilitate placement and securement of the pump 30 and intake lines 18. The pump 30 may be secured by brackets 44 inside the handle 14. The brackets 44 are preferably C-clamps and are molded with the brush 10. The pump 30 is preferably made from plastic for ease of manufacture, cost efficiency, and light-weight design. The plastic employed for both the brush and pump should be rigid. The intake lines 18 preferably comprise a flexible plastic to simplify bending during construction. Other materials, such as wood, aluminum or stainless steel may be substituted without departing from the scope and spirit of the invention.

Figure 5:
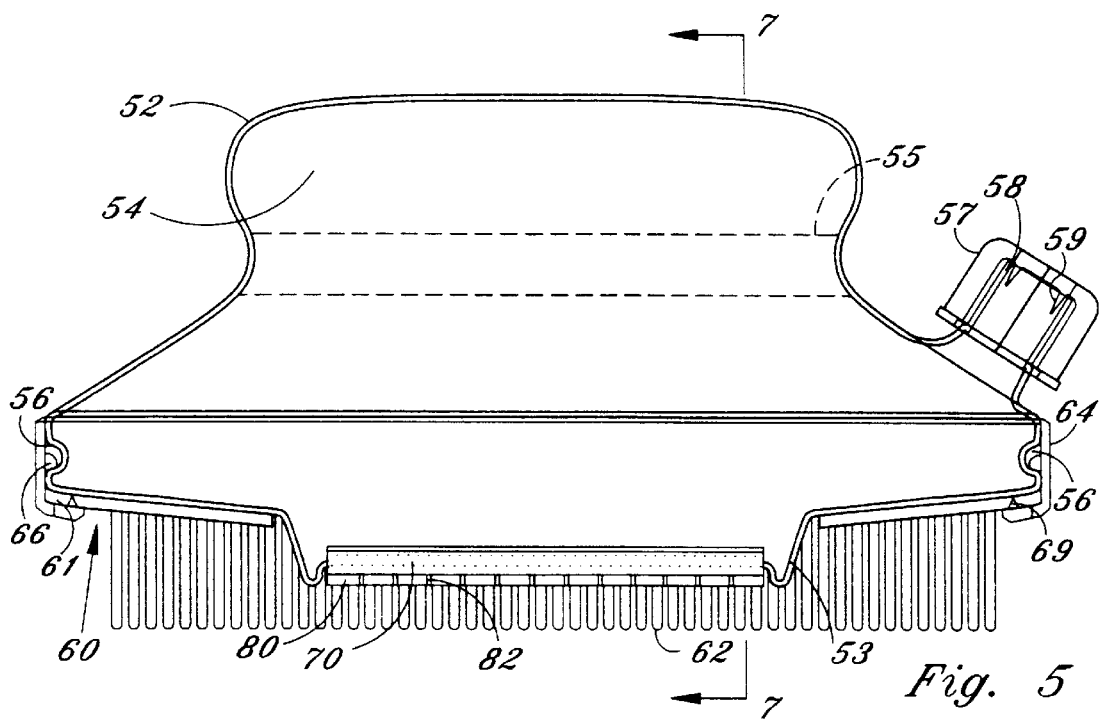
FIG. 5 is a cross sectional side view of another embodiment of the instant invention, taken along line 5—5 of FIG. 7.
Figure 6:
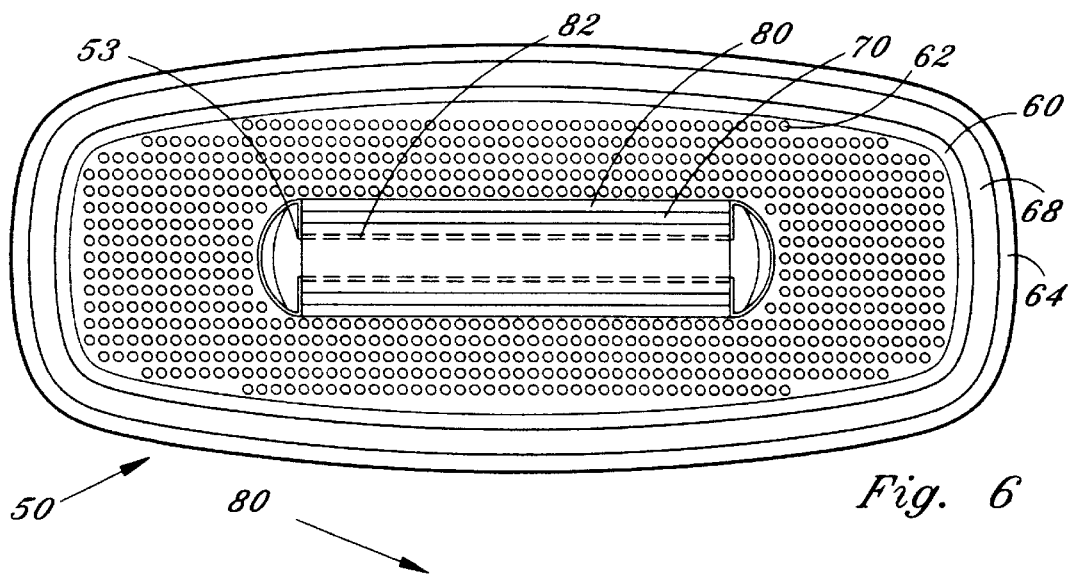
FIG. 6 is a bottom elevational view of the embodiment of the instant invention shown in FIG. 5.
Figure 10:
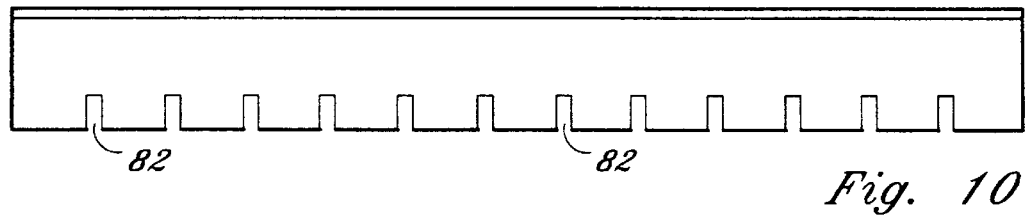

With reference to FIGS. 5–7, another embodiment of the instant invention, characterized by the reference numeral 50, comprises a semi-pliable, or squeezable, body 52, a bristle attachment 60, a locking ring 64, a sponge-like membrane 70, membrane clip support 80 and a cap 57. The body 52 provides a greater height than conventional brush handles and is tapered at its mid-section to form a waist. This design facilitates blow molding, or injection molding, and increases a user's leverage so that it may be easily gripped, squeezed and rotated when brushing a pet. The body 52 also acts as a reservoir 54 for holding the flea solution and includes a spout opening 58 and corresponding cap 57 for convenient filling and draining of solution. The cap 57 defines a depending flange 59 about its interior radial wall to securely and sealingly grip the spout 58. The cap 57 may include an o-ring or washer for sealed engagement with the spout 58 and a vent for releasing air pressure. A stabilizing belly band 55 wraps around the waist of the body 52 to stabilize the shape of the brush 50. The lower portion of the body 52 defines a protrusion 53 and the lowest portion of the reservoir 54. The protruding portion 53 is perforated with a plurality of openings 51 to release fluid from the reservoir 54 into the membrane 70 when the body 52 is gently squeezed. In fact, the perforations 51 are sized to provide the right surface tension to saturate the membrane 70 during use.

The membrane 70 preferably comprises a sponge, rubber or similar porous or sponge-like material having predetermined characteristics so that it is capable of retaining and releasing flea solution or fluid. The membrane 70 filters the solution and impedes flow so as to control the absorption and flow of fluid at predetermined rates for the most efficient treatment of a pet. The membrane 70 wraps around the protrusion 53 and is secured in place by an elongated bell-shaped clip support 80 which holds the membrane 70 in place and facilitates vigorous contact with the pet without dislodging the membrane 70. Referring to FIG. 7, the clip 80 resembles a bell or horseshoe when viewed in cross section from either end. The bell clip 80 extends across the protruding portion 53 between the rounded ends and includes a plurality of perforations 82 of predetermined size for passing fluid from the membrane 70, through the clip 80 and onto the pet when the body 52 is squeezed. The body 52 exerts stress and pressure on the membrane 70 when squeezed to force fluid out of the membrane 70. As shown in FIG. 7, the clip 80 is substantially U-shaped with tapered, or inwardly converging, legs. The clip 80 is semi-rigid, bendable and resilient so that the clip legs stretch over the body protrusion 53 and firmly grip the protrusion 53 when released. Sufficient force is exerted by the clip 80 over the membrane 70 so that the membrane 70 does not dislodge without the requisite intent to remove.

Referring to FIG. 5, the brush also includes a removable bristle attachment 60. The bristle attachment 60 comprises a plurality of bristles 62 attached to an annular base 61. The base 61 is adapted for sliding over the body protrusion 53 and within the peripheral edge and confines of the body 52. The base 61 may be semi-pliable to accommodate convenient attachment to the body 52. The bristles 62 are attached to the base 61 by conventional means and include rounded or smooth ends for the comfort of the pet.

The bristle attachment 60 is secured to the brush with a locking ring 64. The locking ring 64 defines an oval, ring-like structure adapted to conform to the outer wall and shape of the body 52. The ring 64 comprises an inwardly protruding latch 66 which snaps into a corresponding groove 56 defined around the body's 52 outer wall. The latch 66 and groove 56 may be continuous or discontinuous without departing from the scope and spirit of the instant invention. A lower lip 68 projects inwardly from the ring 64 to grip the underside of the base 61 and a plurality of spikes 69 project upwardly from the lip 68 to pierce the base 61. The tongue-and-groove snap connection formed by the latch 66 and groove 56, and the lip 68 and spikes 69 act in concert to firmly secure the bristle attachment 60. In addition, the locking ring 64 together with the belly band 55 assist in stabilizing the shape of the brush 50.

The alternative brush design 50 provides several advantages. The brush 50 has snap-fitted, removable parts for replacement and simple, convenient cleaning of dirt and grime which can collect in a pet brush. For instance, the clip and membrane 70 may be removed and cleaned or replaced by simply dislodging the clip 80. Likewise, the locking ring 66 is snapped on to the brush body 52 allowing it to be removed to facilitate cleaning or replacement of the bristle attachment 60. The brush body 52 includes a spout 58 and removable cap 59 to fill, drain and refill flea solution and to clean the reservoir between uses. The body 52 may also have a flat top surface so that it may be placed upside down to prevent fluid from entering the membrane 70. Finally, the brush 50 has a uni-body structure and curvature contours which may be easily and inexpensively manufactured by blow molding or injection molding. The brush may be blow molded or injection molded into a custom bottle-like design with polyethylene, polypropylene or similar durable and pliable plastic-like materials. The curved contours of the brush 50 facilitate convenient tooling and molding.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A pet flea brush for simultaneously grooming a pet animal and treating it for fleas with a flea-killing solution, said flea brush comprising:

a body structure;

a fluid reservoir defined by said body structure for holding the solution;

a plurality of bristles projecting outward from a selected area of said body structure;

fluid dispensing means, in fluid communication with said reservoir, for dispensing the solution when brushing the pet, said fluid dispensing means comprising at least one aperture in said body structure and a porous membrane, in fluid communication with said aperture and attached to said body structure, for absorbing and retaining the solution and dispensing the solution when brushing the pet;

a clip adaptable for attachment to said body structure for securing said membrane to said body structure, said clip simultaneously holding said membrane against said body structure and gripping said body structure; and said body structure defining a pump means for forcing the solution from said reservoir to said fluid dispensing means when squeezing said base structure.

2. A flea brush as recited in claim 1, wherein said pump means comprises a pliable wall structure defined by said body structure which exerts pressure on the solution when said pliable wall structure is squeezed by the user to force the solution from said reservoir and into said membrane.

3. A flea brush as recited in claim 1, wherein said body structure and reservoir includes a protruding base section, said clip being adapted for mounting said membrane to said base section by gripping said base section.

4. A flea brush as recited in claim 1, wherein said clip comprises a means for passing the solution from said membrane to the pet when said membrane dispenses the solution.

5. A flea brush as recited in claim 1, further comprising means for filling and draining said fluid chamber with the solution.

6. A flea brush as recited in claim 5, further comprising means for sealing said filling and draining means, said sealing means being adapted for attachment to said filling and draining means.

7. A flea brush as recited in claim 1, wherein said bristles are removably attached to said body structure.

8. A pet flea brush for simultaneously grooming a pet animal and treating it for fleas with a flea fighting solution, said flea brush comprising:

a body structure;

a fluid reservoir defined by said body structure for holding the solution, said body structure having a pliable wall structure for exerting a pressure on the solution when said body structure is squeezed by a user to force the solution out of said reservoir;

a plurality of bristles projecting outward from a selected area of said body structure;

fluid dispensing means, in fluid communication with said reservoir, for absorbing and dispensing the solution when squeezing said body structure and brushing the pet, said fluid dispensing means comprising a porous membrane attached to said body structure for absorbing and retaining the solution and dispensing the solution when brushing the pet;

a clip adaptable for attachment to said body structure for securing said fluid dispensing means to said body structure, said clip simultaneously holding said membrane against said body structure and gripping said body structure; and gripping means, defined by said body structure, for holding and squeezing said body structure.

9. A flea brush as recited in claim 8, further comprising means for filling and draining said fluid chamber with the solution.

10. A flea brush as recited in claim 9, wherein said body structure and reservoir includes a protruding base section, said clip being adapted for mounting said membrane to said base section by gripping said base section, said base section fluidly communicating said reservoir and said membrane.

11. A flea brush as recited in claim 10, wherein said clip comprises at least one aperture for passing the solution from said membrane when said membrane dispenses the solution.

12. A flea brush as recited in claim 8, wherein said gripping means comprises a raised body structure having a tapered waist section for facilitating gripping and squeezing to simultaneously dispense the solution while brushing the pet.

13. A flea brush as recited in claim 12, wherein said bristles are removably attached to said body structure.

\* \* \* \* \*